United States Patent
Okabe

(10) Patent No.: US 12,266,962 B2
(45) Date of Patent: Apr. 1, 2025

(54) CHARGING CONTROL APPARATUS, CHARGING CONTROL SYSTEM, AND CHARGING CONTROL METHOD

(71) Applicant: HONDA MOTOR CO., LTD., Tokyo (JP)

(72) Inventor: Hiroto Okabe, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 559 days.

(21) Appl. No.: 17/671,753

(22) Filed: Feb. 15, 2022

(65) Prior Publication Data

US 2022/0302725 A1    Sep. 22, 2022

(30) Foreign Application Priority Data

Mar. 22, 2021 (JP) ................................ 2021-047353

(51) Int. Cl.
H02J 7/00        (2006.01)

(52) U.S. Cl.
CPC ............ *H02J 7/0049* (2020.01); *H02J 7/005* (2020.01); *H02J 7/0071* (2020.01); *H02J 7/007188* (2020.01)

(58) Field of Classification Search
None
See application file for complete search history.

(56) References Cited

U.S. PATENT DOCUMENTS

| | | | |
|---|---|---|---|
| 2005/0134225 A1* | 6/2005 | Mese | H01M 10/425 320/132 |
| 2012/0053900 A1 | 3/2012 | Maini et al. | |
| 2012/0256588 A1 | 10/2012 | Hayashi et al. | |
| 2021/0278473 A1* | 9/2021 | Maruno | G01R 31/385 |

FOREIGN PATENT DOCUMENTS

| | | |
|---|---|---|
| JP | 2012-228005 A | 11/2012 |
| JP | 2012-228165 A | 11/2012 |
| JP | 2012-527213 A | 11/2012 |
| JP | 2014-195383 A | 10/2014 |

OTHER PUBLICATIONS

Office Action dated Sep. 6, 2022, issued over the corresponding Japanese Patent Application No. 2021-047353.

* cited by examiner

*Primary Examiner* — Arun C Williams
(74) *Attorney, Agent, or Firm* — Carriar, Shende & Associates P.C.; Joseph P. Carrier; Jeffrey T. Gedeon

(57) ABSTRACT

A charging control apparatus of an embodiment includes a history acquiring section that acquires history information indicating a usage situation and a charging situation of a battery; a pattern determining section that determines a charging period pattern that most closely resembles a charging habit of a user based on the history information; a display control section that controls a display section to display a charging end SOC, charging start SOC, and tolerable lower limit SOC corresponding to the determined charging period pattern in the display section; and a charging control section that, if a setting is changed in a manner to lower the charging end SOC according to a manipulation by the user, controls the battery to be charged based on the charging end SOC resulting from the change.

8 Claims, 12 Drawing Sheets

FIG. 3

| BEHAVIOR CLASSIFICATION | | DATA USED |
|---|---|---|
| TIME PERIOD | CERTAIN INTERVAL | CHARGING INTERVAL |
| | CERTAIN DAY OF THE WEEK | DAY WHEN CHARGING IS STARTED |
| TIMING PERIOD | EVERY TIME SOC DROPS BELOW A CERTAIN SOC | CHARGING START SOC |
| | EVERY TIME THE VEHICLE IS USED | CHARGING FREQUENCY EVERY TIME THE VEHICLE IS USED |
| | EVERY TIME THE SAME LOCATION IS ARRIVED AT | CHARGING FREQUENCY EVERY TIME THE SAME LOCATION IS ARRIVED AT |

FIG. 4

| PRIORITY MATRIX | | TIME PERIOD | | | TIMING PERIOD | |
|---|---|---|---|---|---|---|
| | | CERTAIN INTERVAL | CERTAIN DAY OF THE WEEK | EVERY TIME THE REMAINING CAPACITY DROPS BELOW A CERTAIN AMOUNT | EVERY TIME THE VEHICLE IS USED | EVERY TIME THE SAME LOCATION IS ARRIVED AT |
| TIME PERIOD | CERTAIN INTERVAL | CERTAIN INTERVAL | | EVERY TIME THE REMAINING CAPACITY DROPS BELOW A CERTAIN AMOUNT | EVERY TIME THE VEHICLE IS USED | EVERY TIME THE SAME LOCATION IS ARRIVED AT |
| | CERTAIN DAY OF THE WEEK | | CERTAIN INTERVAL | CERTAIN INTERVAL | EVERY TIME THE VEHICLE IS USED | EVERY TIME THE SAME LOCATION IS ARRIVED AT |
| TIMING PERIOD | EVERY TIME THE REMAINING CAPACITY DROPS BELOW A CERTAIN AMOUNT | | | CERTAIN INTERVAL | EVERY TIME THE VEHICLE IS USED | EVERY TIME THE SAME LOCATION IS ARRIVED AT |
| | EVERY TIME THE VEHICLE IS USED | | | | EVERY TIME THE VEHICLE IS USED | EVERY TIME THE SAME LOCATION IS ARRIVED AT |
| | EVERY TIME THE SAME LOCATION IS ARRIVED AT | | | | | |

CHARGING CONTROL APPARATUS, CHARGING CONTROL SYSTEM, AND CHARGING CONTROL METHOD

CROSS-REFERENCE TO RELATED APPLICATIONS

This application is based upon and claims the benefit of priority from Japanese Patent Application No. 2021-047353 filed on Mar. 22, 2021, the contents of which are incorporated herein by reference.

BACKGROUND OF THE INVENTION

Field of the Invention

The present invention relates to a charging control apparatus, a charging control method, and a charging control system.

Description of the Related Art

JP 2012-228165 A discloses an electric automobile charging control system that controls charging of an electric automobile. The electric automobile charging control system predicts a usage pattern of the electric automobile for each day of the week, and checks whether the remaining power amount of the battery will cause trouble with travel on the following day. If charging of the battery is necessary, the electric automobile charging control system charges the battery based on the predicted usage pattern, in a manner to avoid full charging and reduce the number of times charging is performed in the future.

SUMMARY OF THE INVENTION

In JP 2012-228165 A, the charging amount of the battery is set in a manner to delay the next scheduled charging day. However, if the power consumption amount for one day is low, the SOC (remaining capacity) of the battery is held in a relatively high state for several days. Therefore, from the viewpoint of suppressing the deterioration of the battery, there is a desire to improve the charging control of the battery.

The present invention has an objective of realizing the above desire.

A first aspect of the present invention is a charging control apparatus that control charging of a battery from an external power source, comprising a history acquiring section that acquires history information indicating a usage situation and a charging situation of the battery; a pattern determining section that determines a charging period pattern that most closely resembles a charging habit of a user, from among a plurality of charging period patterns classified in advance, based on the history information; a display control section that controls a display section to display a charging end SOC, charging start SOC, and tolerable lower limit SOC corresponding to the determined charging period pattern in the display section; and a charging control section that, if a setting is changed in a manner to lower the charging end SOC according to a manipulation by the user, controls the battery to be charged based on the charging end SOC resulting from the change.

Another aspect of the present invention is a charging control system comprising the battery and the charging control apparatus such as described above.

Yet another aspect of the present invention is a charging control method for controlling charging of a battery from an external power source, comprising a history acquiring step of acquiring history information indicating a usage situation and a charging situation of the battery; a pattern determining step of determining a charging period pattern that most closely resembles a charging habit of a user, from among a plurality of charging period patterns classified in advance, based on the history information; a display control step of displaying a charging end SOC and charging start SOC corresponding to the determined charging period pattern in a display section; and a charging control step of, if a setting is changed in a manner to lower the charging end SOC according to a manipulation by the user, controls the battery to be charged based on the charging end SOC resulting from the change.

With these aspects of the present invention, the charging period pattern that most closely resembles the charging habit of the user is determined based on the history information of the battery, and the charging end SOC, charging start SOC, and tolerable lower limit SOC corresponding to this charging period pattern are displayed. Due to this, the user can understand their own charging situation and change the charging end SOC while checking what the charging start SOC will become in consideration of this charging situation. Furthermore, with these aspects of the present invention, when the setting is changed in a manner to lower the charging end SOC in response to a manipulation by the user, the charging control apparatus controls the battery to perform charging based on the charging end SOC resulting from the change. Due to this, it is possible to suppress the deterioration of the battery in consideration of the charging situation of the user.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a table in which the charging behavior is the user classified;

FIG. 4 is a table showing an example of a priority ranking of charging periods;

DESCRIPTION OF THE INVENTION

The following describes details of preferred embodiments of the present invention, while referencing the accompanying drawings.

1. Schematic Configuration of the Present Embodiment

Figure 1:
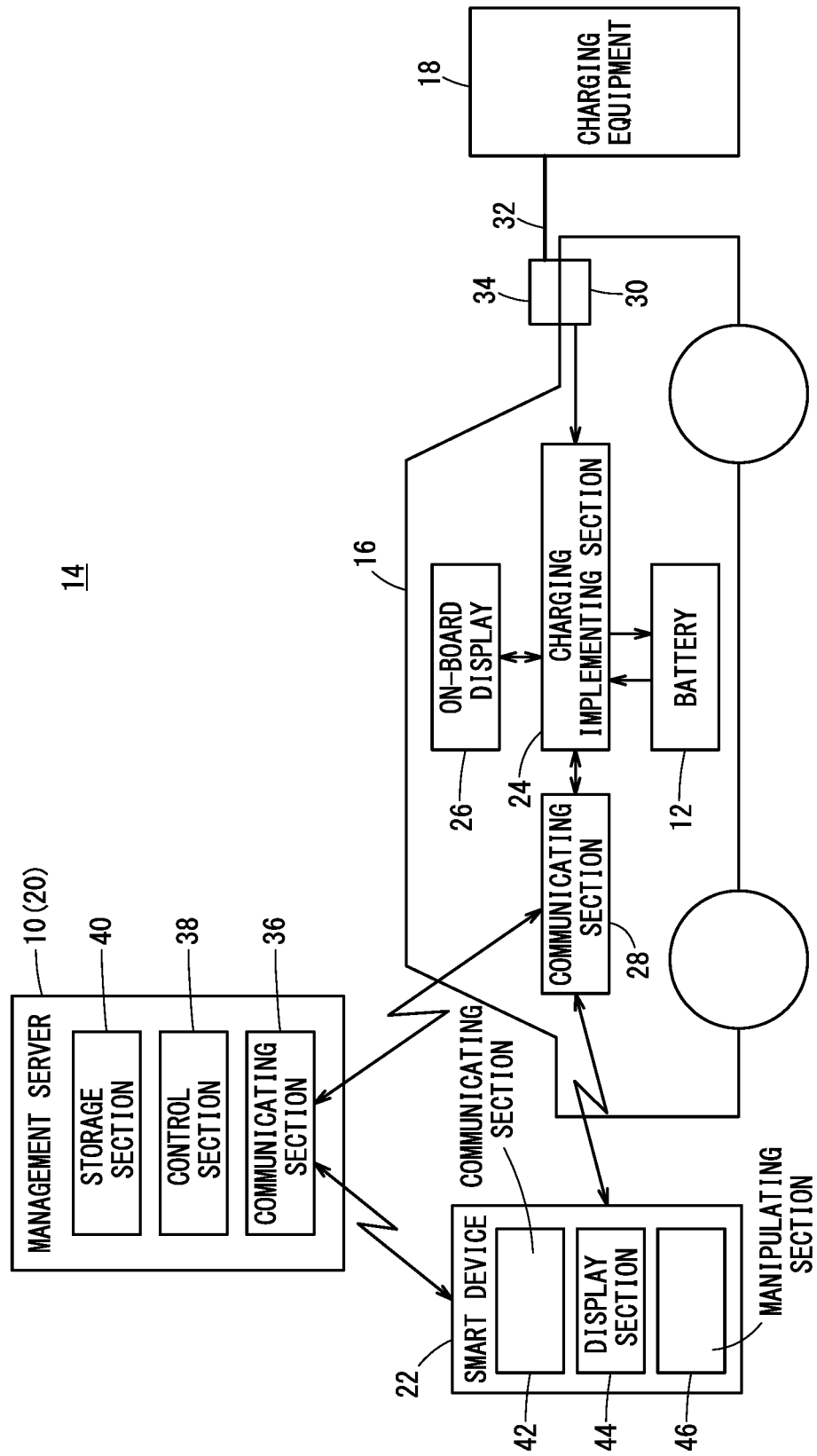
FIG. 1 is a block diagram of a charging control system that includes a charging control apparatus and a battery, according to an embodiment.

FIG. 1 is a block diagram of a charging control system 14 including a charging control apparatus 10 and a battery 12, according to an embodiment. The charging control system 14 includes a vehicle 16, charging equipment 18, a management server 20, and a smart device 22. The vehicle 16 is a moving body in which the battery 12 is installed. The charging equipment 18 is a power source outside the vehicle 16. The smart device 22 is an information communication device that is used by a user. The user is a user of the battery 12, and is also a user of the vehicle 16. The charging control apparatus 10 controls charging performed from the charging equipment 18 to the battery 12 installed in the vehicle 16. In the description below, a case is described in which the management server 20 is the charging control apparatus 10.

In the present embodiment, the moving body is an object capable of moving (being driven) by the supply of power from the battery 12. The present embodiment is applicable to various types of moving bodies including various vehicles such as two-wheel, three-wheel, and four-wheel vehicles, flying bodies such as airplanes, boats, and the like. The present invention is not limited to a moving body, and is also applicable to charging control of a battery 12 in various types of devices that are driven by the supply of power from the battery 12.

In the present embodiment, a case is described in which the battery 12 is charged from the charging equipment 18 in a plug-in method. In the present embodiment, the charging equipment 18 is capable of charging the battery 12 using a non-contact power supply method.

In a case where the moving body is a vehicle 16, an electric vehicle that travels using power supplied from the battery 12 is included in the scope of this vehicle 16. Furthermore, the vehicle 16 may be a hybrid vehicle. A hybrid vehicle includes a motor and an internal combustion engine. The motor receives the power supplied from the battery 12 and is driven.

In the present embodiment, an ECU (not shown in the drawings) inside the vehicle 16 may be the charging control apparatus 10. Alternatively, the smart device 22 may be the charging control apparatus 10.

The vehicle 16 includes the battery 12, a charging implementing section 24, an on-board display 26, a communicating section 28, and a charging port 30. A charging connector 34 (charging gun) is inserted into the charging port 30. The charging connector 34 is provided at a tip of a cable 32 extending from the charging equipment 18. When the charging connector 34 is inserted into the charging port 30, charging of the battery 12 from the charging equipment 18 is possible. In this case, the charging implementing section 24 implements charging of the battery 12 from the charging equipment 18, according to the control of the management server 20. Furthermore, the charging implementing section 24 monitors the SOC (remaining capacity) of the battery 12, and stores history information indicating a usage situation and charging situation of the battery 12 in an internal memory.

The history information includes a date and time of the charging start, a date and time of the charging completion, a location of charging (position information), a charging amount resulting from one instance of charging, a unit consumption amount (amount consumed per unit of distance), and the like.

The on-board display 26 is a navigation apparatus or the like provided to the vehicle 16. The on-board display 26 is capable of displaying various types of information as images, and of outputting the various types of information as sound. The on-board display 26 includes a manipulating section such as a touch panel or the like that is capable of receiving manipulation input from the user. The on-board display 26 includes a GNSS sensor and a map database, and is capable of acquiring position information and route information of the vehicle 16.

The communicating section 28 transmits and receives various types of information by communicating wirelessly with the management server 20 and the smart device 22. For example, the communicating section 28 transmits, in response to a request from the management server 20, the history information stored in the internal memory of the charging implementing section 24 to the management server 20.

The management server 20 includes a communicating section 36, a control section 38, and a storage section 40. The communicating section 36 can communicate wirelessly with each of the communicating section 28 of the vehicle 16 and a communicating section 42 of the smart device 22. The control section 38 can control each of the vehicle 16 and the smart device 22, via the communicating section 36. The storage section 40 stores various types of information and the like acquired from the vehicle 16 and the smart device 22.

The smart device 22 includes the communicating section 42, a display section 44, and a manipulating section 46. The communicating section 42 can communicate wirelessly with each of the communicating section 36 of the management server 20 and the communicating section 28 of the vehicle 16. The display section 44 displays the various types of information as images. The manipulating section 46 is a touch panel or the like that receives manipulation input from the user.

2. Configuration of the Control Section of the Charging Control Apparatus

In the present embodiment, a charging control program for controlling the charging of the battery 12 loaded in the vehicle 16 is stored in the storage section 40 of the management server 20. The control section 38 is provided with a processor that executes the charging control program.

Figure 2:
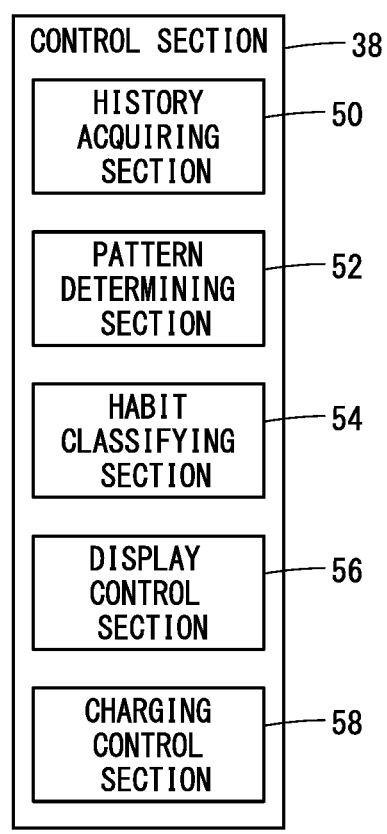
FIG. 2 is a block diagram showing a configuration of a control section.

FIG. 2 is a block diagram showing a configuration of the control section 38. The processor of the control section 38 functions as a history acquiring section 50, a pattern determining section 52, a habit classifying section 54, a display control section 56, and a charging control section 58 upon executing the charging control program stored in the storage section 40. At least one of the history acquiring section 50, the pattern determining section 52, the habit classifying section 54, the display control section 56, and the charging control section 58 may be realized by an integrated circuit such as an ASIC or an FPGA. Furthermore, at least one of the history acquiring section 50, the pattern determining section 52, the habit classifying section 54, the display control section 56, and the charging control section 58 may be formed by an electronic circuit including a discrete device.

The history acquiring section 50 acquires history information indicating the usage situation and charging situation of the battery 12. For example, the history acquiring section 50 acquires history information amounting to a specified number of days, using a day as a unit. The history acquiring section 50 acquires the history information from the vehicle 16. In this case, the history acquiring section 50 makes a request for the history information of the battery 12 to the communicating section 28 of the vehicle 16, via the communicating section 36, and stores the history information of the battery 12 transmitted from the communicating section 28 in the internal memory.

The vehicle 16 may transmit the history information to the management server 20, without receiving a request for the history information of the battery 12 from the management server 20. In this case, the history acquiring section 50 stores in the internal memory the history information of the battery 12 to be transmitted from the communicating section 28 of the vehicle 16 via the communicating section 36.

The pattern determining section 52 determines a charging period pattern that most closely resembles the charging habit of the user, from among a plurality of charging period patterns classified in advance, based on the history information acquired by the history acquiring section 50.

FIG. 3 is a chart in which the charging behavior of the user is classified. The charging behavior of the user can be classified into a plurality of periodic viewpoints (patterns). In the present embodiment, the charging behavior of the user is classified into five charging period patterns, including two time period patterns and three timing period patterns.

The first of the two time period patterns is a "certain interval". This "certain interval" does not refer to a single fixed interval, but instead refers to intervals that are within approximately the same range despite having variations. For example, if the user has a charging habit of tending to perform charging approximately every 18 hours, this charging behavior of the user can be classified as a charging period pattern of a "certain interval". The data used for the charging period pattern of the "certain interval" is a charging interval. The charging interval is the time difference between two charging start timings that are closest in time. The charging start timings are included in the history information.

The second of the two time period patterns is a "certain day of the week". The "certain day of the week" does not refer to a single fixed day, but instead refers to days of the week that are within approximately the same range despite having variations. For example, if the user has a charging habit of tending to perform charging every Sunday, this charging behavior of the user can be classified as a charging period pattern of a "certain day of the week". The data used for the charging period pattern of the "certain day of the week" is a day of the week of the charging start timing. The days of the week of the charging start timings are included in the history information.

The first of the three timing period patterns is the charging period pattern of "every time the SOC (remaining capacity) drops below a certain SOC". This certain SOC does not refer to a single fixed remaining capacity, but instead refers to SOCs that are within approximately the same range despite having variations. For example, if the user has a charging habit of tending to perform charging every time the SOC reaches a tolerable lower limit SOC, this charging behavior of the user can be classified as a charging period pattern of "every time the SOC drops below a certain SOC". The tolerable lower limit SOC is a capacity set in advance as a lower limit allowed for the remaining capacity of the battery 12. In general, when the SOC has dropped below the tolerable lower limit SOC, a warning is issued indicating that the SOC of the battery 12 will soon be exhausted. The data used for the charging period pattern of "every time the SOC drops below a certain SOC" is a charging start SOC. The charging start SOC is the SOC at the charging start timing, and is included in the history information.

The second of the three timing period patterns is the charging period pattern of "every time the vehicle is used". For example, if the user has a charging habit of tending to perform charging every time the vehicle is used three times, this charging behavior of the user can be classified as a charging period pattern of "every time the vehicle is used". Here, use of the vehicle 16 from when the ignition is turned ON to when the ignition is turned OFF is treated as one use. The data used for the charging period pattern of "every time the vehicle is used" is a value obtained by dividing the number of uses of the vehicle 16 by the number of times charging is performed. This value indicates the frequency at which charging is performed every time the vehicle 16 is used. The number of uses and number of times charging is performed when travel starts are included in the history information.

The third of the three timing period patterns is the charging period pattern of "every time the same location is arrived at". This same location does not refer to a single fixed location, but instead refers to locations that are within approximately the same range despite having variations. For example, if the user has a charging habit of tending to perform charging every time the user arrives at the office, this charging behavior of the user can be classified as a charging period pattern of "every time the same location is arrived at". The data used for the charging period pattern of "every time the same location is arrived at" is a value obtained by dividing the number of times charging is performed by the number of times charging is started at approximately the same location (position information). This value indicates the frequency with which charging is performed every time the same location is arrived at. The number of times charging is performed and the location (position information) are included in the history information.

In the present embodiment, the pattern determining section 52 determines the charging period pattern that most closely resembles the charging habit of the user, from among the five charging period patterns, using a statistical technique such as standard deviation. For example, the pattern determining section 52 determines the charging period pattern having the smallest variation within a prescribed time period, such as one month, to be the charging period pattern that most closely resembles the charging behavior of the user.

There are cases where two or more charging period patterns all fit the charging habit of the user. In such a case, there are two or more charging period patterns that result in the smallest variation, or the difference between the charging period pattern with the smallest variation and the charging period pattern with the second smallest variation is a very small difference that is less than a threshold value. In other words, cases can occur in which there are two or more charging period patters that resemble the charging behavior of the user.

Therefore, data indicating a priority ranking of charging periods is stored in the storage section 40. FIG. 4 is a chart showing a charging period priority ranking. In FIG. 4, the "certain day of the week" charging period pattern is given a higher priority ranking than the "certain interval" charging period pattern. Accordingly, if both the "certain interval" charging period pattern and the "certain day of the week" charging period pattern are charging period patterns that resemble the charging habit of the user, the pattern determining section 52 determines the "certain day of the week" charging period pattern to be the charging period pattern that resembles the charging habit of the user.

In this way, if there are two or more charging period patterns that resemble the charging habit of the user, the pattern determining section 52 determines the charging period pattern having the highest priority ranking to be the charging period pattern that most closely resembles the charging habit of the user, by using the priority data.

The habit classifying section 54 classifies the charging habit of the user into one of a plurality of thought patterns, based on the history information acquired by the history acquiring section 50. The charging habit of the user tends to change depending on the thoughts of the user. For example, there are significant differences between a charging habit whereby the user thinks about charging early just to be safe, a charging habit whereby the user thinks that they want to perform charging as infrequently as possible, and a charging habit whereby the user thinks that they want to perform charging every day. In other words, the charging habits of the user can be classified based on the viewpoint of thoughts (patterns).

Figure 5:
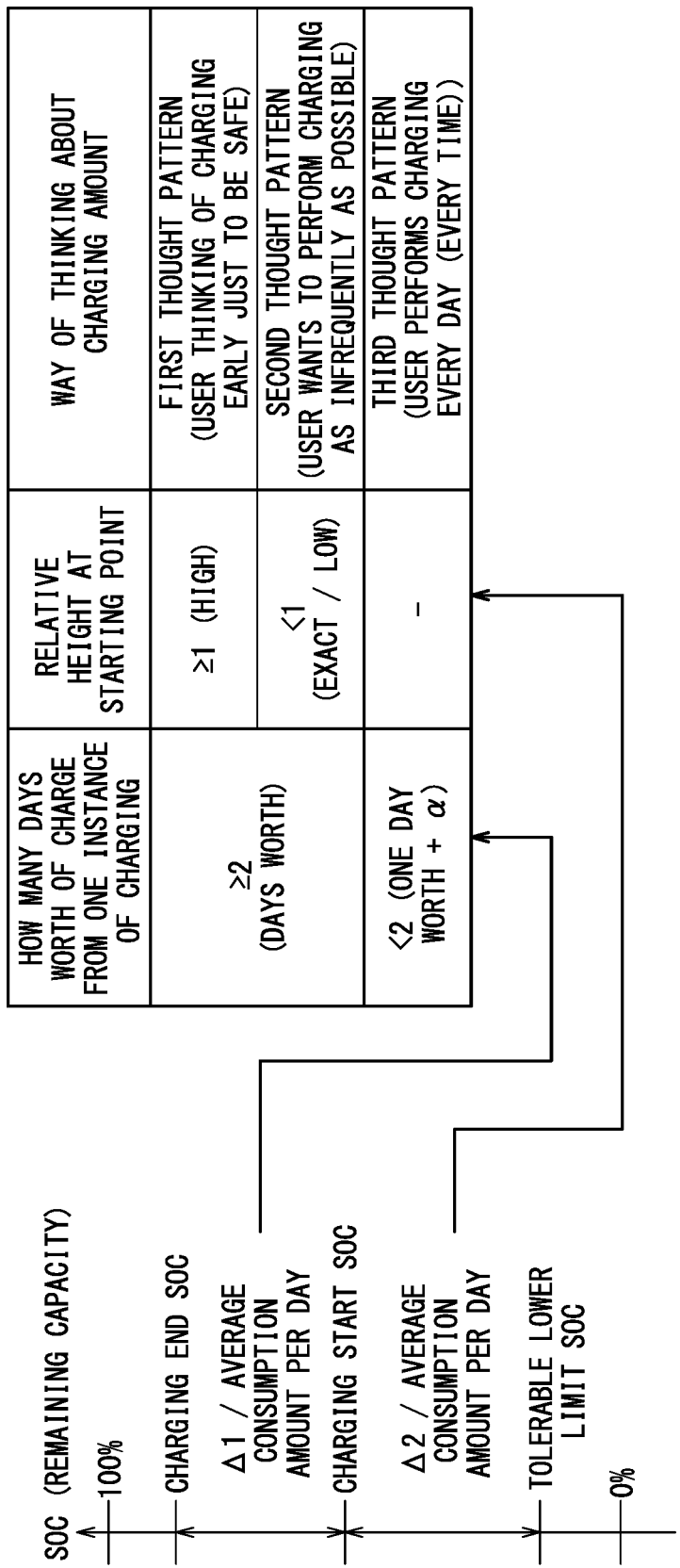
FIG. 5 is a schematic diagram concerning the classification of thoughts of the user.

FIG. 5 is a schematic diagram relating to classification based on the user thoughts. In the present embodiment, the user charging habit is classified as one of a first thought pattern, a second thought pattern, and a third thought pattern, based on two classification conditions. In FIG. 5, the first thought pattern represents a user who is thinking of performing charging early just to be safe. The second thought pattern represents a user thinking that they want to perform charging as infrequently as possible. The third thought pattern represents a user thinking that they want to perform charging every day. These representations are merely examples.

The first of the classification conditions is a condition of how many days worth of charging is achieved in a single instance of charging. This condition is defined as a ratio (first ratio) of the average charging amount Δ1 of one instance of charging to the average consumption amount per prescribed interval. The average charging amount Δ1 of one instance of charging is the average of a value obtained by subtracting the charging start SOC from the charging end SOC. In the present embodiment, the prescribed interval is one day. The charging end SOC is the SOC at the charging end timing, and is included in the history information. The average consumption amount per day can be calculated from the charging date and time, the charging end SOC, and the charging start SOC included in the history information.

The second of the classification conditions is a condition that the charging start point is relatively high. This condition is defined as a ratio (second ratio) of an average remaining amount Δ2 at the time of charging to the average consumption amount per day. The average remaining amount Δ2 is the average of a value obtained by subtracting the tolerable lower limit SOC from the charging start SOC. The tolerable lower limit SOC may be included in the history information, and may be stored in the storage section 40.

The habit classifying section 54 calculates the first ratio based on the history information, and compares this first ratio to a first threshold value. Furthermore, the habit classifying section 54 calculates the second ratio based on the history information, and compares this second ratio to a second threshold value. The second threshold value is smaller than the first threshold value. In FIG. 5, an example is shown of a case where the first threshold value is set to "2" and the second threshold value is set to "1".

Here, if the first ratio is greater than or equal to the first threshold value and the second ratio is greater than or equal to the second threshold value, the habit classifying section 54 classifies this habit as the first thought pattern. On the other hand, if the first ratio is greater than or equal to the first threshold value and the second ratio is less than the second threshold value, the habit classifying section 54 classifies this habit as the second through pattern. If the first ratio is less than the first threshold value, the habit classifying section 54 classifies this habit as the third thought pattern.

In the above description, there are three thought patterns and two classification conditions, but the numbers of patterns and conditions is not limited to those of the present embodiment. If the number of conditions is greater than or equal to three, the classification conditions can be set appropriately. Furthermore, the habit classifying section 54 may classify the charging habit of the user using only the first ratio or the second ratio. If the charging habit of the user is classified using only the first ratio or the second ratio, the number of thought patterns becomes two.

The display control section 56 controls at least one of the display section (on-board display 26) of the vehicle 16 and the display section 44 of the smart device 22. The display control section 56 transmits the display data and issues a request for display of the display data, via the communicating section 36, and displays a charging situation screen based on this display data.

Figure 6:
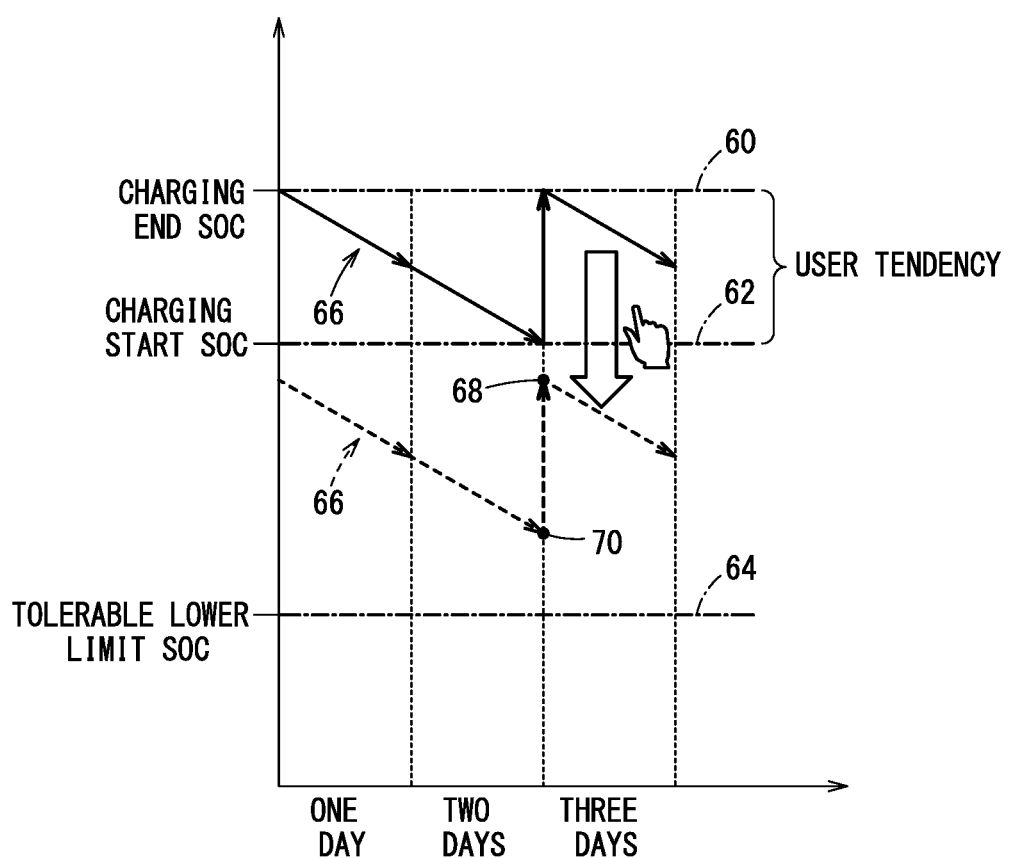
FIG. 6 shows an example of a charging situation screen in a case where the charging period is the "certain interval" charging period pattern.

FIG. 6 shows an example of the charging situation screen in a case where the charging period is the "certain interval" charging period pattern. In a case where the charging period pattern determined by the pattern determining section 52 is the "certain interval" charging period pattern, the display control section 56 displays the charging end SOC 60, the charging start SOC 62, and the tolerable lower limit SOC 64, as well as an SOC transition 66. The slope of the waveform indicating the SOC transition 66 corresponds to the average consumption amount per day, and the height of this waveform corresponds to the average charging amount Δ1 of one instance of charging (FIG. 5).

In FIG. 6, the SOC transition 66 is shown by the solid line arrows in the graph. In the graph, the horizontal axis indicates days, and the vertical axis indicates the capacity of the battery 12. By observing the SOC transition 66 represented by the solid line arrows, it is understood that there is a charging period in which the charging repeats in units of roughly two days. Furthermore, by observing the SOC transition 66 represented by the solid line arrows, it is understood that the charging end SOC 60 can be reduced to a degree whereby the charging start SOC 62 does not reach the tolerable lower limit SOC 64. Therefore, the user is given an opportunity to change the settings in a manner to lower the charging end SOC 60.

Figure 7:
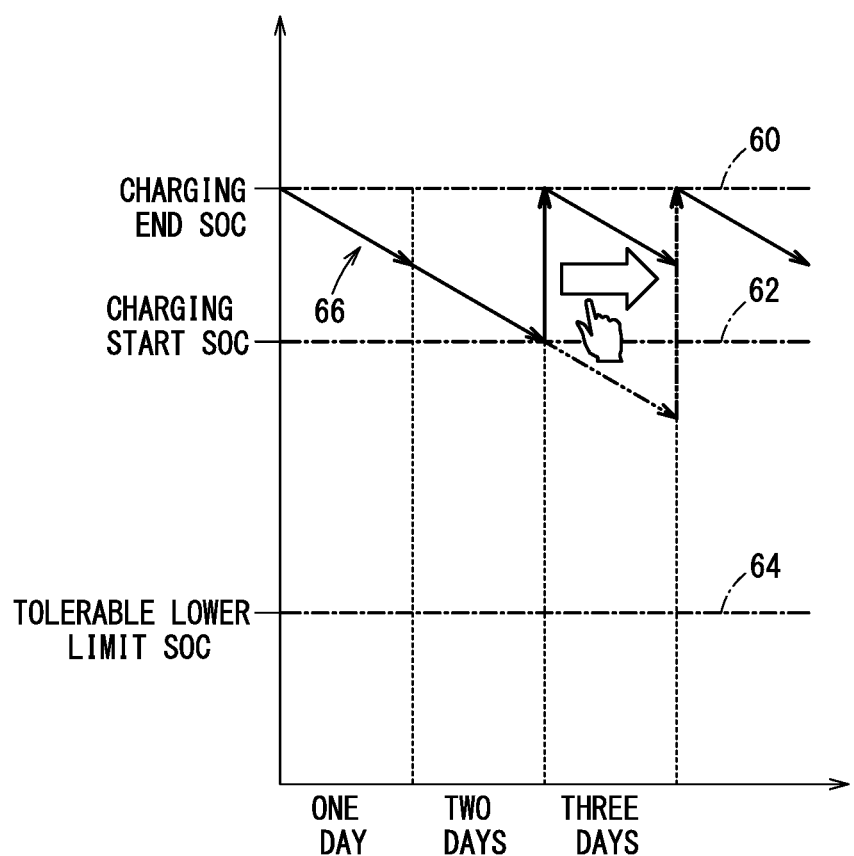
FIG. 7 shows a state in which the setting for the interval of the "certain interval" charging period pattern has been changed.

The user can change the settings in manner to lower the charging end SOC 60 through a manipulation such as a swiping manipulation. The user can change the settings for their own charging tendencies as well (see FIG. 7). FIG. 7 shows an example of a case where a setting change is performed from a charging period in which charging is repeated in units of two days to a charging period in which charging is repeated in units of three days.

The display control section 56 displays the recommended charging end SOC 68 and the recommended charging start SOC 70, according to the thought pattern classified by the habit classifying section 54. If the thought pattern classified by the habit classifying section 54 is the first thought pattern, the display control section 56 displays the recommended charging start SOC 70 in a manner to be higher than the tolerable lower limit SOC 64. On the other hand, if the thought pattern classified by the habit classifying section 54 is the second through pattern or the third thought pattern, the display control section 56 displays the recommended charging start SOC 70 in a manner to match the tolerable lower limit SOC 64.

For the "certain interval" charging period pattern, the SOC transition 66 occurring when a change has been made to the recommended charging end SOC 68 and the recommended charging start SOC 70 is displayed. In other words, the time period pattern of the user is not changed, and the recommended charging end SOC 68 and recommended charging start SOC 70 corresponding to the thought pattern of the user are displayed.

In FIG. 6, the SOC transition 66 occurring when a change has been made to the recommended charging end SOC 68 and the recommended charging start SOC 70 is shown by the dashed arrows. Furthermore, FIG. 6 shows the recommended charging end SOC 68 and recommended charging start SOC 70 corresponding to a user who thinks about performing charging early just to be safe (first thought pattern). By comparing the solid line arrows to the dashed line arrows in FIG. 6, it is understood that it is possible to make an improvement of suppressing deterioration of the battery 12, without negatively affecting the charging tendency of the user.

Figure 8:
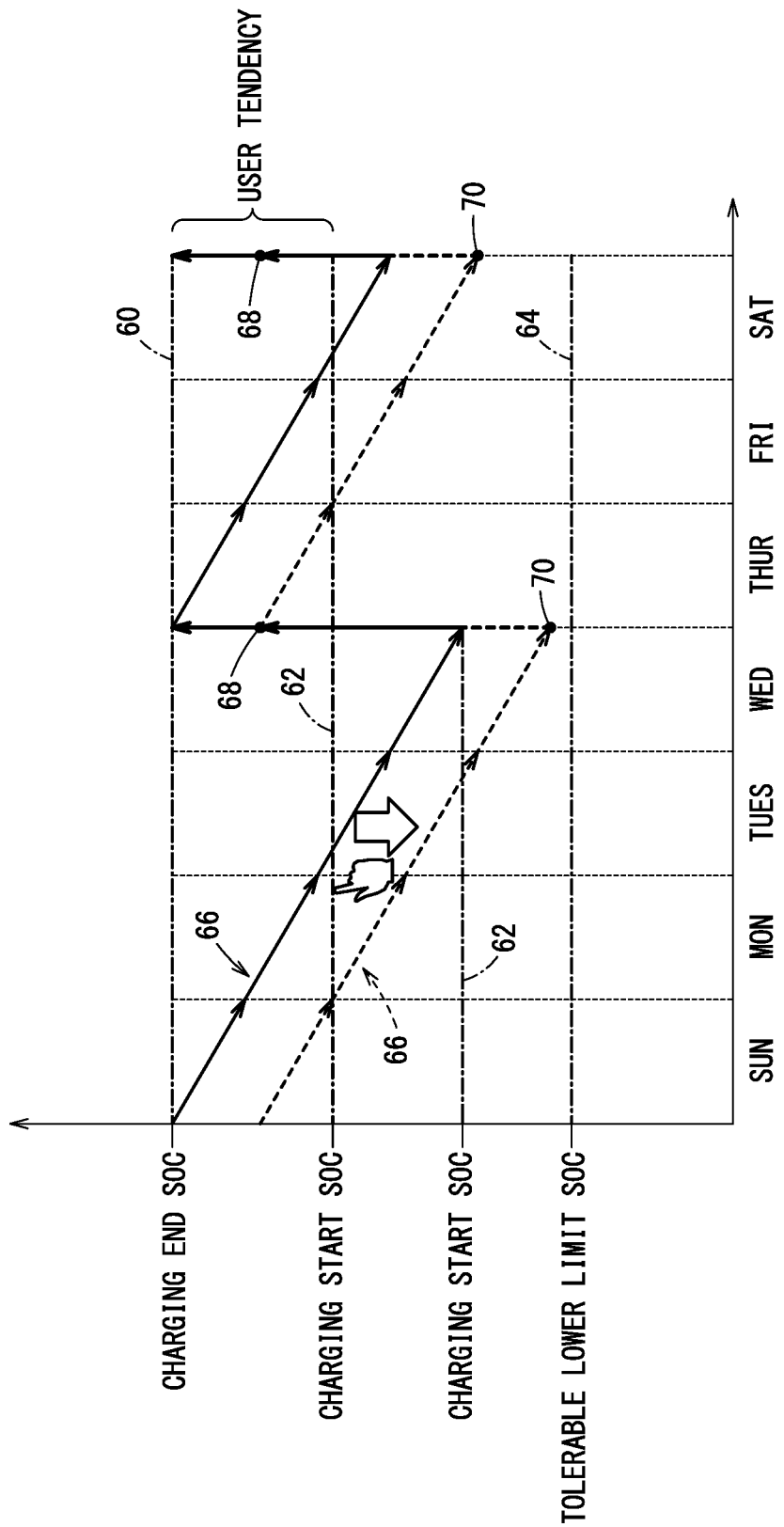
FIG. 8 shows an example of a charging situation screen in a case where the charging period is the "certain day of the week" charging period pattern.

FIG. 8 shows an example of a charging situation screen in a case where the charging period is the "certain day of the week" charging period pattern. When the charging period pattern determined by the pattern determining section 52 is the "certain day of the week" charging period pattern, the display control section 56 displays the SOC transition 66 along with the charging end SOC 60, the charging start SOC 62, and the tolerable lower limit SOC 64. In other words, for the "certain day of the week" charging period pattern, the SOC transition 66 is displayed in addition to the charging end SOC 60, the charging start SOC 62, and the tolerable lower limit SOC 64, in the same manner as for the "certain interval" charging period pattern.

In FIG. 8, the SOC transition 66 is shown by the solid line arrows in the graph. In this graph, the horizontal axis indicates the day of the week and the vertical axis indicates the capacity of the battery 12. By observing the SOC transition 66 indicated by the solid line arrows in FIG. 8, it is understood that there is a charging period in which charging is repeated mostly every Wednesday and Saturday. Furthermore, by observing the SOC transition 66 indicated by the solid line arrows in FIG. 8, it is understood that the charging end SOC 60 can be lowered toward the tolerable lower limit SOC 64 to a degree whereby the charging start SOC 62 does not reach the tolerable lower limit SOC 64. Therefore, the user is given the opportunity to change the settings in a manner to lower the charging end SOC 60.

The display control section 56 displays not only the recommended charging end SOC 68 and recommended charging start SOC 70 corresponding to the thought pattern classified by the habit classifying section 54, but also the SOC transition 66. In other words, the time period pattern of the user is not changed and the recommended charging end SOC 68 and recommended charging start SOC 70 corresponding to the thought pattern of the user are displayed, in the same manner as for the "certain interval" charging period pattern.

In FIG. 8, the SOC transition 66 occurring when a change has been made to the recommended charging end SOC 68 and the recommended charging start SOC 70 is shown by the dashed arrows. Furthermore, FIG. 8 shows the recommended charging end SOC 68 and recommended charging start SOC 70 corresponding to a user who thinks about performing charging early just to be safe (first thought pattern). Therefore, by comparing the solid line arrows to the dashed line arrows in FIG. 8, it is understood that it is possible to make an improvement of suppressing deterioration of the battery 12, without negatively affecting the charging tendency of the user.

Figure 9:
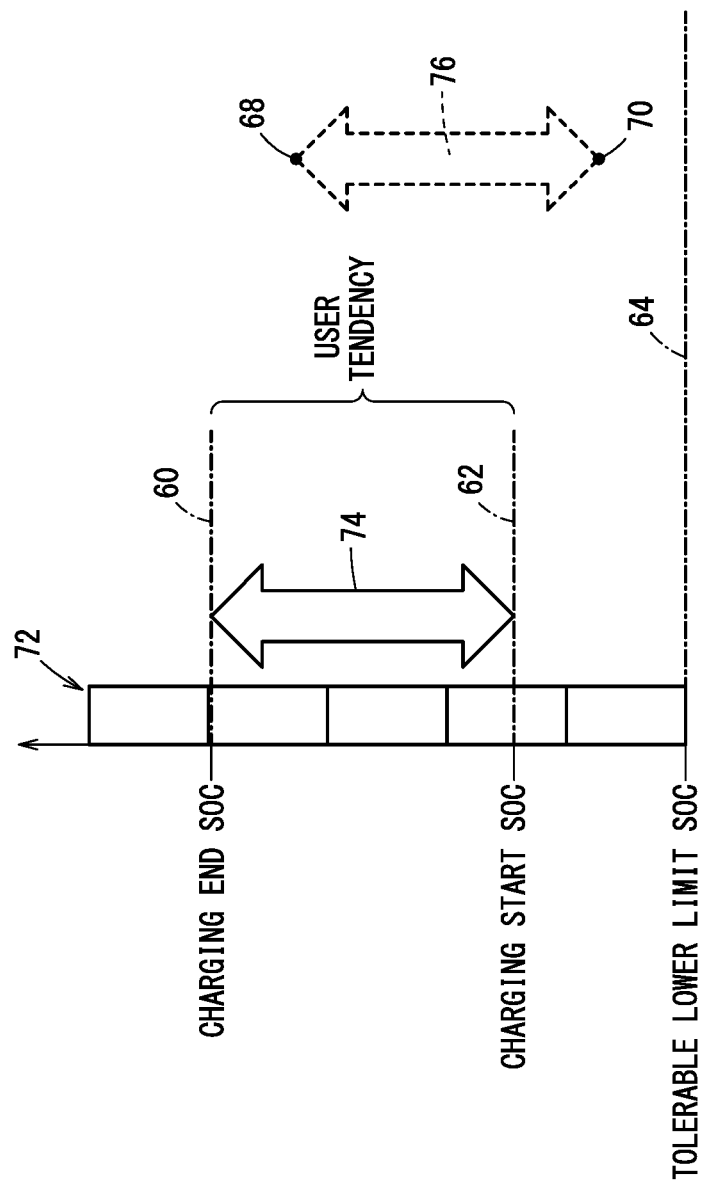
FIG. 9 shows an example of a charging situation screen in a case where the charging period is the "every time the SOC drops below a certain SOC" charging period pattern.

FIG. 9 shows an example of a charging situation screen in a case where the charging period is the "every time the SOC drops below a certain SOC" charging period pattern. When the charging period pattern determined by the pattern determining section 52 is the "every time the SOC drops below a certain SOC" charging period pattern, the display control section 56 displays a scale 72 along with the charging end SOC 60, the charging start SOC 62, and the tolerable lower limit SOC 64. In other words, for the "every time the SOC drops below a certain SOC" charging period pattern, the scale 72 is displayed in addition to the charging end SOC 60, the charging start SOC 62, and the tolerable lower limit SOC 64. The scale 72 divides a charging range, which is obtained by subtracting the tolerable lower limit SOC 64 from the full capacity of the battery 12, by the per-day average consumption amount. The display control section 56 may display a mark 74 indicating the range between the charging end SOC 60 and the charging start SOC 62.

In FIG. 9, an example is shown of a case where the scale 72 is divided into five portions and the mark 74 indicating the range between the charging end SOC 60 and charging start SOC 62 is shown by solid lines. By observing the scale 72 and the mark 74 (the charging end SOC 60 and the charging start SOC 62), it is understood that the average charging amount Δ1 of one instance of charging corresponds to a consumption amount of 2.5 days. Furthermore, it is understood that the charging end SOC 60 can be dropped toward the tolerable lower limit SOC 64 to a degree whereby the charging start SOC 62 does not reach the tolerable lower limit SOC 64. Therefore, the user is given the opportunity to change the settings in a manner to lower the charging end SOC 60.

The display control section 56 displays the recommended charging end SOC 68 and recommended charging start SOC 70 corresponding to the thought pattern classified by the habit classifying section 54. At this time, the display control section 56 displays the recommended charging end SOC 68 and the recommended charging start SOC 70 without changing the interval between the charging end SOC 60 and charging start SOC 62. In other words, the recommended charging end SOC 68 and recommended charging start SOC 70 corresponding to the thought pattern of the user are displayed, without the timing period pattern of the user being changed. The display control section 56 may display a mark 76 indicating the range between the recommended charging end SOC 68 and the recommended charging start SOC 70.

In FIG. 9, the mark 76 is shown by dashed lines. Furthermore, FIG. 9 shows the recommended charging end SOC 68 and recommended charging start SOC 70 corresponding to a user who thinks about performing charging early just to be safe (first thought pattern). Therefore, by comparing the mark 74 to the mark 76, it is understood that it is possible to make an improvement of suppressing deterioration of the battery 12, without negatively affecting the charging tendency of the user.

Figure 10:
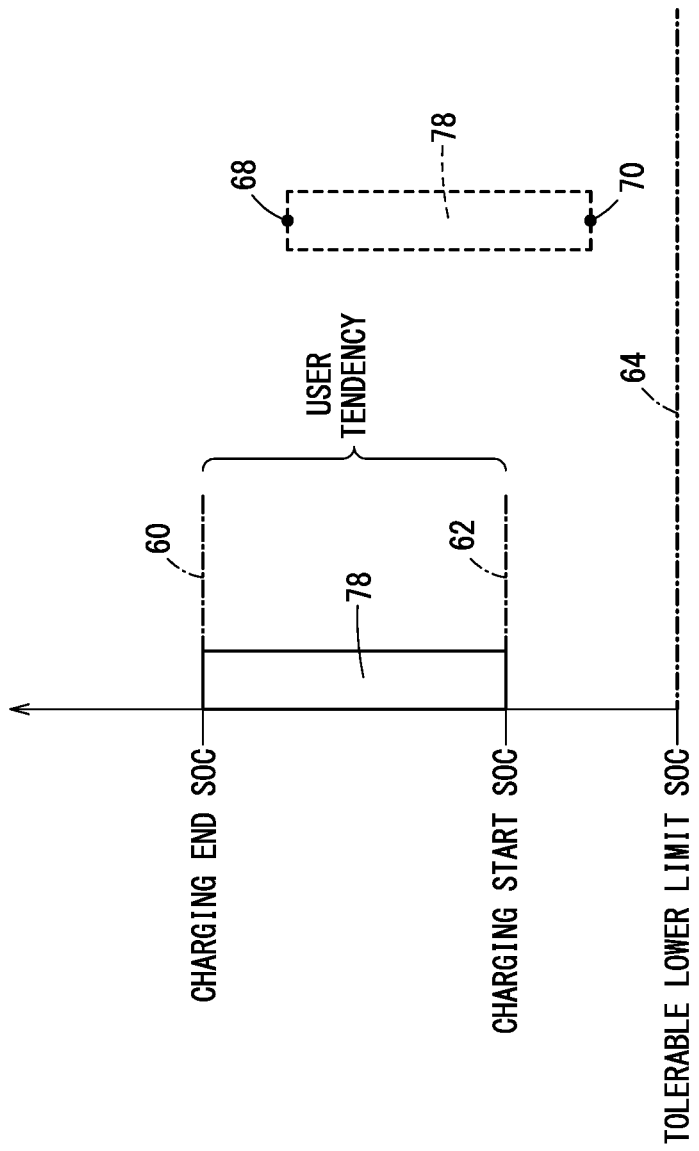
FIG. 10 shows an example of a charging situation screen in a case where the charging period is the "every time the same location is arrived at" charging period pattern.

FIG. 10 shows an example of a charging situation screen in a case where the charging period is the "every time the vehicle is used" charging period pattern. When the charging period pattern determined by the pattern determining section 52 is the "every time the vehicle is used" charging period pattern, the display control section 56 displays a scale 78 along with the charging end SOC 60, the charging start SOC 62, and the tolerable lower limit SOC 64. In other words, for the "every time the vehicle is used" charging period pattern, the scale 78 is displayed in addition to the charging end SOC 60, the charging start SOC 62, and the tolerable lower limit SOC 64. The scale 78 indicates a value obtained by dividing the average charging amount Δ1 of one instance of charging (see FIG. 5) by the per-day average consumption amount.

In FIG. 10, an example is shown of a case where the scale 78 is not divided. By observing the scale 78, it is understood that the average charging amount Δ1 of one instance of charging corresponds to a consumption amount of one day. Furthermore, it is understood that the charging end SOC 60 can be dropped toward the tolerable lower limit SOC 64 to a degree whereby the charging start SOC 62 does not reach the tolerable lower limit SOC 64. Therefore, the user is given the opportunity to change the settings in a manner to lower the charging end SOC 60.

The display control section 56 displays the recommended charging end SOC 68 and recommended charging start SOC 70 corresponding to the thought pattern classified by the habit classifying section 54. At this time, the display control section 56 displays the recommended charging end SOC 68 and the recommended charging start SOC 70 without changing the interval between the charging end SOC 60 and charging start SOC 62. In other words, the recommended charging end SOC 68 and recommended charging start SOC 70 corresponding to the thought pattern of the user are displayed, without the timing period pattern of the user being changed. The display control section 56 may display the scale 78 along with the recommended charging end SOC 68 and the recommended charging start SOC 70.

In FIG. 10, the scale 78 is shown by dashed lines. Furthermore, FIG. 10 shows the recommended charging end SOC 68 and recommended charging start SOC 70 corresponding to a user who thinks about performing charging early just to be safe (first thought pattern). Therefore, by comparing the charging end SOC 60 and charging start SOC 62 to the recommended charging end SOC 68 and recommended charging start SOC 70, it is understood that it is possible to make an improvement of suppressing deterioration of the battery 12, without negatively affecting the charging tendency of the user.

The scale 78 is displayed for the "every time the vehicle is used" charging period pattern, but the scale 72 and mark 74 used for the "every time the SOC drops below a certain SOC" charging period pattern may be displayed instead of the scale 78. In this way as well, it is understood how many days worth of the consumption amount the average charging amount Δ1 of one instance of charging corresponds to. On the other hand, the scale 72 and mark 74 are displayed for the "every time the SOC drops below a certain SOC" charging period pattern, but the scale 78 used for the "every time the vehicle is used" charging period pattern may be displayed instead of the scale 72 and mark 74. In this way as well, it is understood how many days worth of the consumption amount the average charging amount Δ1 of one instance of charging corresponds to.

Figure 11:
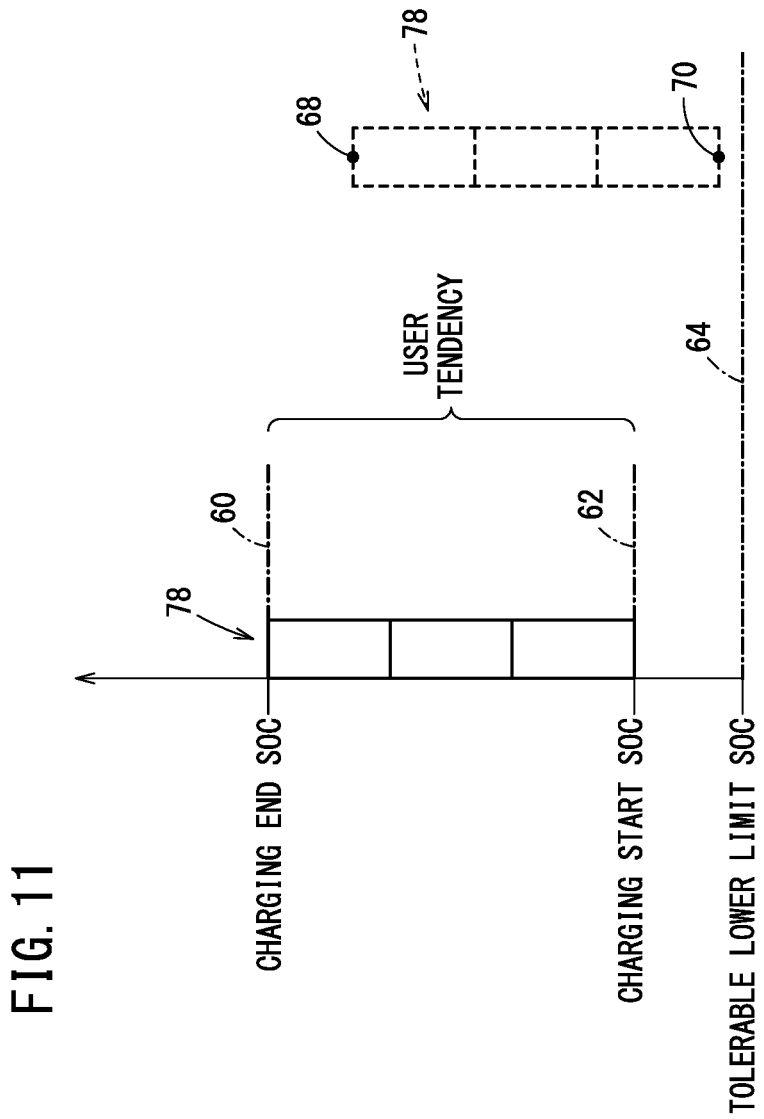
FIG. 11 shows an example of a charging situation screen in a case where the charging period is the "every time the vehicle is used" charging period pattern.

FIG. 11 shows an example of a charging situation screen in a case where the charging period is the "every time the same location is arrived at" charging period pattern. When the charging period pattern determined by the pattern determining section 52 is the "every time the same location is arrived at" charging period pattern, the display control section 56 displays the scale 78 along with the charging end SOC 60, the charging start SOC 62, and the tolerable lower limit SOC 64. In other words, for the "every time the same location is arrived at" charging period pattern, the scale 78 is displayed in addition to the charging end SOC 60, the charging start SOC 62, and the tolerable lower limit SOC 64.

In FIG. 11, an example is shown of a case where the scale 78 is divided into three portions. By observing the scale 78, it is understood that the average charging amount Δ1 of one instance of charging corresponds to a consumption amount of three days. Furthermore, it is understood that the charging end SOC 60 can be lowered toward the tolerable lower limit SOC 64 to a degree whereby the charging start SOC 62 does not reach the tolerable lower limit SOC 64. Therefore, the user is given the opportunity to change the settings in a manner to lower the charging end SOC 60.

The display control section 56 displays the recommended charging end SOC 68 and recommended charging start SOC 70 corresponding to the thought pattern classified by the habit classifying section 54. At this time, the display control section 56 displays the recommended charging end SOC 68 and the recommended charging start SOC 70 without changing the interval between the charging end SOC 60 and charging start SOC 62. In other words, the recommended charging end SOC 68 and recommended charging start SOC 70 corresponding to the thought pattern of the user are displayed, without the timing period pattern of the user being changed. The display control section 56 may display the scale 78 along with the recommended charging end SOC 68 and the recommended charging start SOC 70.

In FIG. 11, the scale 78 is shown by dashed lines. Furthermore, FIG. 11 shows the recommended charging end SOC 68 and recommended charging start SOC 70 corresponding to a user who thinks about performing charging early just to be safe (first thought pattern). Therefore, by comparing the charging end SOC 60 and charging start SOC 62 to the recommended charging end SOC 68 and recommended charging start SOC 70, it is understood that it is possible to make an improvement of suppressing deterioration of the battery 12, without negatively affecting the charging tendency of the user.

The scale 78 is displayed for the "every time the same location is arrived at" charging period pattern, but the scale 72 and mark 74 of the "every time the SOC drops below a certain SOC" may be displayed instead of the scale 78. In this way as well, it is understood how many days worth of the consumption amount the average charging amount Δ1 of one instance of charging corresponds to.

The charging control section 58 controls the battery 12. The charging control section 58 controls the battery 12 by transmitting command data for executing the charging operation of the battery 12 in accordance with the charging plan defined by the charging program, to the vehicle 16 via the communicating section 36.

If a setting change that lowers the charging end SOC 60 is performed according to a manipulation by the user based on the charging situation screen or the like displayed in accordance with the control of the display control section 56, the charging control section 58 changes the charging operation of the battery 12. In this case, the charging control section 58 creates new command data based on the charging plan and the charging end SOC 60 resulting from the setting change, and controls the battery 12 by transmitting the created command data to the vehicle 16 via the communicating section 36.

3. Charging Control Method

Figure 12:
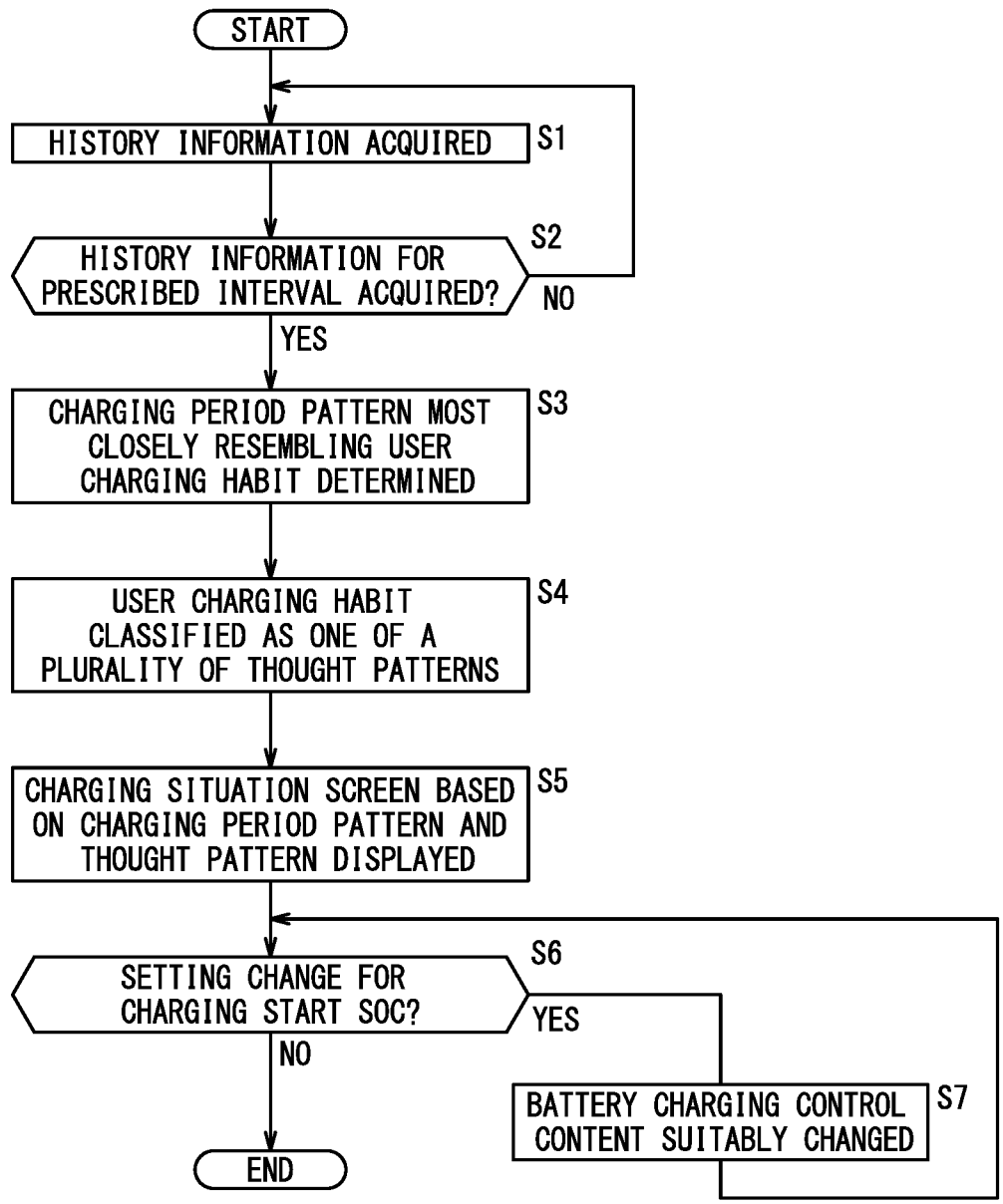
FIG. 12 is a flow chart showing a procedure of the charging control process performed by the processor executing the charging control program.

FIG. 12 is a flow chart showing a procedure of a charging control process performed by a processor that executes the charging control program.

At step S1, the history acquiring section 50 acquires the history information for a prescribed unit time interval (e.g. one day), and stores this history information in an internal memory. When the history information for the prescribed unit time interval is stored in the internal memory, the charging control process moves to step S2.

At step S2, the history acquiring section 50 judges whether the history information for a prescribed time interval (e.g. one week) has been acquired. Here, if the history acquiring section 50 judges that the history information for the prescribed time interval has not been acquired (step S2: NO), the charging control process returns to step S1. On the other hand, if the history acquiring section 50 judges that the history information for the prescribed time interval has been acquired (step S2: YES), the charging control process moves to step S3.

At step S3, the pattern determining section 52 determines the charging period pattern that most closely resembles the charging habit of the user, from among a plurality of charging period patterns classified in advance, based on the history information. When the charging period pattern is determined, the charging control process moves to step S4.

At step S4, the habit classifying section 54 classifies the charging habit of the user as one of a plurality of thought patterns, based on the history information. When the charging habit of the user is classified, the charging control process moves to step S5.

At step S5, the display control section 56 controls at least one of the display section (on-board display 26) of the vehicle 16 and the display section 44 of the smart device 22, and displays the charging situation screen corresponding to the determined charging period pattern. This charging situation screen includes the charging end SOC 60, the charging start SOC 62, the tolerable lower limit SOC 64, the recommended charging end SOC 68, and the recommended charging start SOC 70. The recommended charging end SOC 68 and the recommended charging start SOC 70 are displayed corresponding to the classified thought pattern. When the charging situation screen is displayed, the charging control process moves to step S6.

At step S6, the charging control section 58 waits for the input of data concerning a setting change of the charging plan. Here, if data concerning the end of the setting change of the charging plan is input to the charging control section 58 from the manipulating section (manipulating section 46 of the smart device 22 or manipulating section provided to the on-board display 26) (step S6: NO), the charging control process ends. On the other hand, if data concerning a setting change of the charging plan is input to the charging control section 58 (step S6: YES), the charging control process moves to step S7.

At step S7, the charging control section 58 determines whether to change the charging plan defined by the charging program, based on the data input from the manipulating section. Here, if the setting is to be changed in a manner to lower the charging end SOC 60 in response to the manipulation by the user, the charging control section 58 determines that the charging plan is to be changed. In this case, the charging control section 58 creates new command data based on the charging plan and the charging end SOC 60 resulting from the setting change, and controls the battery 12 by transmitting the created command data to the vehicle 16 via the communicating section 36.

4. Effects of the Present Embodiment

The charging control apparatus 10 of the present embodiment determines the charging period pattern that most closely resembles the charging habit of the user, based on the history information of the battery 12, and displays the charging end SOC 60, charging start SOC 62, and tolerable lower limit SOC 64 corresponding to this charging period pattern. Due to this, the user can understand their own charging situation and change the charging end SOC 60 while checking what the charging start SOC 62 will become in consideration of this charging situation.

In the present embodiment, when the setting is changed in a manner to lower the charging end SOC 60 in response to a manipulation by the user, the charging control apparatus 10 controls the battery 12 to perform charging based on the charging end SOC 60 resulting from the change. Due to this, it is possible to suppress the deterioration of the battery 12 in consideration of the charging situation of the user.

The charging control apparatus 10 of the present embodiment classifies the charging habit of the user as one of a plurality of thought patterns, based on the history information of the battery 12, and displays the recommended charging end SOC 68 and recommended charging start SOC 70 according to this thought pattern. Due to this, it is possible to compare the charging end SOC 60 and charging start SOC 62 to the recommended charging end SOC 68 and recommended charging start SOC 70. Furthermore, since such a comparison is made possible, the user can be notified in an easily understood manner that an improvement can be made to suppress the deterioration of the battery 12 without negatively affecting the charging tendency.

The charging control apparatus 10 of the present embodiment classifies the charging habit of the user based on at least one of the first ratio and the second ratio. The first ratio is a ratio of the average charging amount Δ1 of one instance of charging to the one-day average consumption amount of the battery 12, and the second ratio is a ratio of the average remaining amount Δ2 at the time of charging to the average charging amount Δ1. Due to this, it is possible to realize high quality classification for a charging habit in agreement with the way the user thinks about charging.

In the present embodiment, if the first ratio is greater than or equal to the first threshold value and the second ratio is greater than or equal to the second threshold value, which is less than the first threshold value, the charging control apparatus 10 displays a recommended charging start SOC 70 that is higher than the tolerable lower limit SOC 64. Due to this, it is possible to provide a recommended charging start SOC 70 that is in agreement with the way that the user thinks about charging.

In the present embodiment, if the first ratio is greater than or equal to the first threshold value and the second ratio is less than the second threshold value, or if the first ratio is less than the first threshold value, the charging control apparatus 10 displays a recommended charging start SOC 70 that matches the tolerable lower limit SOC 64. Due to this, it is possible to provide a recommended charging start SOC 70 that is in agreement with the way that the user thinks about charging.

The charging control apparatus 10 of the present embodiment displays the SOC transition 66 as well, if the determined charging period pattern is a time period pattern. Due to this, the user can understand their own charging period at a glance.

If the determined charging period pattern is a timing period pattern, the charging control apparatus 10 displays how many days worth of the per-day average consumption amount of the battery 12 the average charging amount Δ1 for one instance of charging the battery 12 corresponds to. Due to this, the user can understand at a glance how many days worth of charge the average charging amount of the battery 12 per day corresponds to.

The present invention is not limited to the above-described embodiments, and it goes without saying that various alternative or additional configurations could be adopted therein without departing from the scope of the present invention.

What is claimed is:

1. A charging control apparatus that control charging of a battery from an external power source, comprising:
    a history acquiring section that acquires history information indicating a usage situation and a charging situation of the battery;
    a pattern determining section that determines a charging period pattern that most closely resembles a charging habit of a user, from among a plurality of charging period patterns classified in advance, based on the history information;
    a display control section that controls a display section to display a charging end SOC, charging start SOC, and tolerable lower limit SOC corresponding to the determined charging period pattern in the display section;
    a charging control section that, if a setting is changed in a manner to lower the charging end SOC according to a manipulation by the user, controls the battery to be charged based on the charging end SOC resulting from the change; and
    a habit classifying section that classifies a charging habit of the user as one of a plurality of thought patterns, based on the history information, wherein:
    the display control section displays a recommended charging end SOC and a recommended charging start SOC according to the thought pattern resulting from the classification,
    the habit classifying section classifies the charging habit of the user based on at least one of a first ratio, which is a ratio of an average charging amount of one instance of charging the battery to an average consumption amount of the battery per prescribed interval, and a second ratio, which is a ratio of an average remaining amount indicating an average of a value obtained by subtracting the tolerable lower limit SOC from the charging start SOC to the average consumption amount, and
    if the first ratio is greater than or equal to a first threshold value and the second ratio is greater than or equal to a second threshold value that is less than the first threshold value, the display control section displays the recommended charging start SOC in a manner to be higher than the tolerable lower limit SOC.

2. A charging control apparatus that control charging of a battery from an external power source, comprising:
    a history acquiring section that acquires history information indicating a usage situation and a charging situation of the battery;
    a pattern determining section that determines a charging period pattern that most closely resembles a charging habit of a user, from among a plurality of charging period patterns classified in advance, based on the history information;
    a display control section that controls a display section to display a charging end SOC, charging start SOC, and tolerable lower limit SOC corresponding to the determined charging period pattern in the display section;
    a charging control section that, if a setting is changed in a manner to lower the charging end SOC according to a manipulation by the user, controls the battery to be charged based on the charging end SOC resulting from the change; and
    a habit classifying section that classifies a charging habit of the user as one of a plurality of thought patterns, based on the history information, wherein:
    the display control section displays a recommended charging end SOC and a recommended charging start SOC according to the thought pattern resulting from the classification,
    the habit classifying section classifies the charging habit of the user based on at least one of a first ratio, which is a ratio of an average charging amount of one instance of charging the battery to an average consumption amount of the battery per prescribed interval, and a second ratio, which is a ratio of an average remaining amount indicating an average of a value obtained by subtracting the tolerable lower limit SOC from the charging start SOC to the average consumption amount, and
    if the first ratio is greater than or equal to a first threshold value and the second ratio is less than a second threshold value that is less than the first threshold value, or if the first ratio is less than the first threshold value, the display control section displays the recommended charging start SOC in a manner to match the tolerable lower limit SOC.

3. The charging control apparatus according to claim 1, wherein:
    if the determined charging period pattern is a time period pattern, the display control section displays an SOC transition along with the charging end SOC, the charging start SOC, and the tolerable lower limit SOC.

4. The charging control apparatus according to claim 1, wherein:
    if the determined charging period pattern is a timing period pattern, the display control section displays an indication of how much of an average consumption amount of the battery per prescribed interval an average charging amount of one instance of charging the battery corresponds to, along with the charging end SOC, the charging start SOC, and the tolerable lower limit SOC.

5. A charging control system comprising the battery and the charging control apparatus according to claim 1.

6. The charging control apparatus according to claim 2, wherein:
    if the determined charging period pattern is a time period pattern, the display control section displays an SOC transition along with the charging end SOC, the charging start SOC, and the tolerable lower limit SOC.

7. The charging control apparatus according to claim 2, wherein:
   if the determined charging period pattern is a timing period pattern, the display control section displays an indication of how much of an average consumption amount of the battery per prescribed interval an average charging amount of one instance of charging the battery corresponds to, along with the charging end SOC, the charging start SOC, and the tolerable lower limit SOC.

8. A charging control system comprising the battery and the charging control apparatus according to claim 2.

* * * * *